(12) United States Patent
Imamura et al.

(10) Patent No.: US 11,926,753 B2
(45) Date of Patent: Mar. 12, 2024

(54) FLUORORESIN MATERIAL, FLUORORESIN MATERIAL FOR HIGH FREQUENCY TRANSMISSION, AND COVERED ELECTRIC WIRE FOR HIGH-FREQUENCY TRANSMISSION

(71) Applicant: DAIKIN INDUSTRIES, LTD., Osaka (JP)

(72) Inventors: Hitoshi Imamura, Osaka (JP); Masahiro Kondo, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 801 days.

(21) Appl. No.: 17/041,298

(22) PCT Filed: Feb. 13, 2019

(86) PCT No.: PCT/JP2019/005096
§ 371 (c)(1),
(2) Date: Sep. 24, 2020

(87) PCT Pub. No.: WO2019/187725
PCT Pub. Date: Oct. 3, 2019

(65) Prior Publication Data
US 2021/0024769 A1 Jan. 28, 2021

(30) Foreign Application Priority Data

Mar. 26, 2018 (JP) .................. 2018-057719
Feb. 13, 2019 (JP) .................. 2019-023272

(51) Int. Cl.
C09D 127/18 (2006.01)
C08F 214/26 (2006.01)
H01B 3/44 (2006.01)
H01B 11/00 (2006.01)

(52) U.S. Cl.
CPC ........ *C09D 127/18* (2013.01); *C08F 214/262* (2013.01); *H01B 3/448* (2013.01); *C08F 2800/20* (2013.01); *H01B 11/00* (2013.01)

(58) Field of Classification Search
CPC .. C08F 214/26; C08F 214/262; C08F 214/28; C08F 2800/20; C08F 8/22; C09D 127/18; H01B 11/00; H01B 3/445; H01B 3/448
See application file for complete search history.

(56) References Cited

U.S. PATENT DOCUMENTS

| | | | |
|---|---|---|---|
| 5,546,182 A | 8/1996 | Sota | |
| 6,774,196 B1* | 8/2004 | Taira | C08F 214/262 525/200 |
| 2002/0177667 A1* | 11/2002 | Apostolo | G02B 1/046 522/113 |
| 2004/0197566 A1 | 10/2004 | Shimizu et al. | |
| 2004/0236047 A1* | 11/2004 | Ono | C09D 127/18 526/250 |
| 2005/0020792 A1 | 1/2005 | Aoyama et al. | |
| 2005/0107535 A1 | 5/2005 | Funaki et al. | |
| 2007/0149734 A1* | 6/2007 | Sakakibara | C08F 14/18 174/111 |
| 2008/0281067 A1* | 11/2008 | Nanba | C08F 14/26 526/255 |
| 2011/0272173 A1 | 11/2011 | Shiotsuki et al. | |
| 2016/0322128 A1 | 11/2016 | Imamura et al. | |
| 2017/0260344 A1 | 9/2017 | Imamura et al. | |
| 2018/0265654 A1 | 9/2018 | Imamura et al. | |

FOREIGN PATENT DOCUMENTS

| | | |
|---|---|---|
| CN | 1942493 A | 4/2007 |
| EP | 0 253 400 A2 | 1/1988 |
| EP | 1 150 305 A2 | 10/2001 |
| EP | 3076405 A1 | 10/2016 |
| JP | 63-146908 A | 6/1988 |
| JP | 2000-001518 A | 1/2000 |
| JP | 2000-159948 A | 6/2000 |
| JP | 2001-288227 A | 10/2001 |
| JP | 2001-357731 A | 12/2001 |
| JP | 2003-048992 A | 2/2003 |
| JP | 2005-298581 A | 10/2005 |
| JP | 4228917 B2 | 2/2009 |
| JP | 2010-539252 A | 12/2010 |
| JP | 2016-135862 A | 7/2016 |
| WO | 94/28394 A1 | 12/1994 |
| WO | 2014/007350 A1 | 1/2014 |

OTHER PUBLICATIONS

Extended European Search Report dated Nov. 25, 2021 in Application No. 19777108.2.
International Preliminary Report on Patentability dated Sep. 29, 2020 from the International Bureau in International Application No. PCT/JP2019/005096.
International Search Report for PCT/JP2019/005096 dated May 7, 2019 (PCT/ISA/210).

* cited by examiner

Primary Examiner — William H. Mayo, III
Assistant Examiner — Rhadames Alonzo Miller
(74) Attorney, Agent, or Firm — Sughrue Mion, PLLC

(57) ABSTRACT

A fluororesin material including a melt-fabricable fluororesin, the fluororesin material having a dielectric constant of 2.1 or less and a dielectric loss tangent of 0.00030 or less at 12 GHz. Also disclosed is a fluororesin material for high-frequency transmission including the fluororesin material and a coated electric wire for high-frequency transmission including a solid insulating coating layer made of the fluororesin material.

3 Claims, No Drawings

FLUORORESIN MATERIAL, FLUORORESIN MATERIAL FOR HIGH FREQUENCY TRANSMISSION, AND COVERED ELECTRIC WIRE FOR HIGH-FREQUENCY TRANSMISSION

CROSS REFERENCE TO RELATED APPLICATIONS

This application is a National Stage of International Application No. PCT/JP2019/005096 filed Feb. 13, 2019, claiming priority based on Japanese Patent Application No. 2018-057719 filed Mar. 26, 2018 and Japanese Patent Application No. 2019-023272 filed Feb. 13, 2019.

TECHNICAL FIELD

The present disclosure relates to a fluororesin material, a fluororesin material for high-frequency transmission, and a coated electric wire for high-frequency transmission.

BACKGROUND ART

The development of means of communication utilizing radio waves is remarkable. Along with an increase in the volume of information to be transmitted, radio waves in a high-frequency range have tended to be increasingly used. For example, 3 to 30 GHz microwaves are used for high-frequency wireless LANs, satellite communication, cellular phone base stations, and the like.

As bulk materials for materials used for communication devices that utilize such high frequencies, the development of materials having electrical properties such as a stably low dielectric constant ($\varepsilon_r$) and a low dielectric loss tangent (tan $\delta$) is ongoing. Patent Document 1, for example, proposes a tetrafluoroethylene-based resin molding material having excellent high-frequency electrical properties, which gives a molded article having a dielectric constant of 2.2 or less and a dielectric loss tangent of $1.90 \times 10^{-4}$ or less at 12 GHz.

RELATED ART

Patent Document

Patent Document 1: Japanese Patent Laid-Open No. 2001-288227

SUMMARY OF THE INVENTION

Problem to be Solved by the Invention

However, the tetrafluoroethylene-based resin molding material proposed in Patent Document 1 is non melt-processable, and thus, cannot be melt-fabricated using a conventional processing device, such as an extruder or an injection molding machine, to give a molded article.

Accordingly, an object of the present disclosure is to provide a fluororesin material that can be produced by melt-fabrication and has excellent high-frequency electrical properties.

Means for Solving the Problem

According to the present disclosure, there is provided a fluororesin material comprising a melt-fabricable fluororesin and having a dielectric constant of 2.1 or less and a dielectric loss tangent of 0.00030 or less at 12 GHz.

In the fluororesin material of the present disclosure, the number of functional groups per $10^6$ main-chain carbon atoms of the fluororesin is preferably 6 or less.

In the fluororesin material of the present disclosure, the fluororesin is preferably at least one copolymer selected from the group consisting of a tetrafluoroethylene/(per)fluoro(alkyl vinyl ether) copolymer and a tetrafluoroethylene/hexafluoropropylene copolymer.

According to the present disclosure, there is also provided a fluororesin material for high-frequency transmission comprising the above fluororesin material.

According to the present disclosure, there is also provided a coated electric wire for high-frequency transmission comprising the above fluororesin material as an insulating coating layer, wherein the insulating coating layer is a solid insulating coating layer.

Effects of Invention

According to the present disclosure, a fluororesin material can be provided that can be produced by melt-fabrication and has excellent high-frequency electrical properties.

DESCRIPTION OF EMBODIMENTS

Specific embodiments of the present disclosure will be hereinafter described in detail, although the present disclosure is not limited to the following embodiments.

A fluororesin material of the present disclosure contains a melt-fabricable fluororesin. As used herein, "melt-fabricable" means that a polymer can be melted and processed using a conventional processing device, such as an extruder or an injection molding machine. Thus, the melt-fabricable fluororesin usually has a melt flow rate of 0.01 to 500 g/10 min as measured by the measurement method described below.

As described in Patent Document 1, because a tetrafluoroethylene/hexafluoropropylene copolymer, a tetrafluoroethylene/(per)fluoro(alkyl vinyl ether) copolymer, or the like that is melt-fabricable is obtained by copolymerization of the hexafluoropropylene or (per)fluoro(alkyl vinyl ether), such a copolymer has a large dipole moment, and correspondingly, exhibits a noticeable deterioration in electrical properties in the high-frequency microwave range.

However, it has been found that when the melt-fabricable fluororesin is irradiated with radiation under appropriate irradiation conditions, a fluororesin material having a specific dielectric constant and a specific dielectric loss tangent is obtained, and additionally found that the use of a fluororesin material having such a dielectric constant and such a dielectric loss tangent significantly reduces the attenuation factor of a high-frequency signal, as compared with conventional melt-fabricable fluororesins. The fluororesin material of the present disclosure has been accomplished based on this finding.

The fluororesin material of the present disclosure has a dielectric constant of 2.1 or less and a dielectric loss tangent of 0.00030 or less at 12 GHz.

The dielectric constant of the fluororesin material of the present disclosure is 2.1 or less, preferably 2.10 or less, and more preferably 2.08 or less; the lower limit is not limited, but is preferably 1.80 or more.

The dielectric loss tangent of the fluororesin material of the present disclosure is 0.00030 or less, and preferably 0.00020 or less; the lower limit is not limited, but is preferably 0.00001 or more.

The dielectric constant and the dielectric loss tangent described above are the values obtained by measuring changes in resonant frequency and electric field intensity at a temperature of 20 to 25° C., using the network analyzer HP8510C (manufactured by Hewlett-Packard Company) and a cavity resonator.

The number of functional groups per $10^6$ main-chain carbon atoms of the above fluororesin contained in the fluororesin material of the present disclosure is preferably 6 or less, more preferably 4 or less, still more preferably 2 or less, and particularly preferably 0, in order to obtain superior high-frequency electrical properties. When the fluororesin material is produced by irradiating the fluororesin before irradiation with radiation, the number of functional groups of the fluororesin described above represents the number of functional groups of the fluororesin after irradiation. In addition, the number of functional groups of the fluororesin before irradiation also preferably falls in the above range. An additional functional group is sometimes produced by the irradiation; however, in this case also, superior high-frequency electrical properties can be obtained by adjusting the number of functional groups, including the number of functional groups produced by the irradiation in the above-described range. It is also presumed that when the number of functional groups of the fluororesin before irradiation falls in the above-described range, a crosslinking reaction between functional groups is inhibited during the irradiation of the fluororesin, which improves the high-frequency electrical properties. When the number of functional groups falls in the above-described range, there is the additional advantage that a molding defect such as foaming is unlikely to occur upon molding of the above fluororesin.

Infrared spectroscopy can be used to identify the type of the above functional groups and measure the number of functional groups.

The number of functional groups is specifically measured in the following manner. Initially, the above fluororesin is melted at 330 to 340° C. for 30 minutes and then compression-molded to prepare a film having a thickness of 0.25 to 0.3 mm. This film is analyzed by Fourier transform infrared spectroscopy to obtain an infrared absorption spectrum of the above fluororesin, and then a difference spectrum is obtained between the infrared absorption spectrum and a base spectrum of a completely fluorinated resin containing no functional group. Based on the absorption peak of a specific functional group appearing in this difference spectrum, the number N of the functional groups per $1 \times 10^6$ carbon atoms in the above fluororesin is calculated in accordance with the following equation (A):

$$N = I \times K/t \qquad \text{(A), wherein}$$

I: absorbance;
K: correction factor; and
t: thickness (mm) of the film.

For reference, Table 1 shows the absorption frequencies, molar extinction coefficients, and correction factors for functional groups in the present disclosure. Furthermore, the molar extinction coefficients are those determined based on the FT-IR measurement data of low-molecular-weight model compounds.

TABLE 1

| Functional Group | Absorption Frequency (cm$^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH$_2$, —OH | 3648 | 104 | 2236 | $C_7H_{15}CH_2OH$ |
| —CF$_2$H | 3020 | 8.8 | 26485 | $H(CF_2CF_2)_3CH_2OH$ |
| —CF═CF$_2$ | 1795 | 635 | 366 | $CF_2$═$CF_2$ |

The absorption frequencies of —CH$_2$CF$_2$H, —CH$_2$COF, —CH$_2$COOH, —CH$_2$COOCH$_3$, and —CH$_2$CONH$_2$ are lower by several tens of kaysers (cm$^{-1}$) than the absorption frequencies of —CF$_2$H, —COF, —COOH free, —COOH bonded, —COOCH$_3$, and —CONH$_2$, respectively, shown in the table.

Thus, for example, the number of the functional groups —COF is the sum of the number of the functional groups determined based on the absorption peak at an absorption frequency of 1883 cm$^{-1}$ due to —CF$_2$COF and the number of the functional groups determined based on the absorption peak at an absorption frequency of 1840 cm$^{-1}$ due to —CH$_2$COF.

The above functional groups are a functional group present at an end of the main chain or an end of a side chain of the fluororesin and a functional group present in the main chain or a side chain of the fluororesin. The number of functional groups described above may be the total number of —CF=CF$_2$, —CF$_2$H, —COF, —COOH, —COOCH$_3$, —CONH$_2$, and CH$_2$OH.

The above functional groups are introduced into the fluororesin by means of, for example, a chain transfer agent or a polymerization initiator used to produce the fluororesin. For example, when an alcohol is used as the chain transfer agent, or a peroxide having the structure —CH$_2$OH is used as the polymerization initiator, —CH$_2$OH is introduced into an end of the main chain of the fluororesin. Alternatively, by polymerizing a monomer having a functional group, the above functional group is introduced into an end of a side chain of the fluororesin.

By subjecting the fluororesin having such functional groups to a fluorination treatment, the above fluororesin in which the number of functional groups falls in the above-described range can be obtained. That is, the above fluororesin contained in the fluororesin material of the present disclosure is preferably a fluororesin that has been subjected to a fluorination treatment. The above fluororesin contained in the fluororesin material of the present disclosure also preferably has a —CF$_3$ end group.

The above fluorination treatment can be performed by contacting the fluororesin before the fluorination treatment with a fluorine-containing compound.

Examples of the above fluorine-containing compound include, but are not limited to, a fluorine radical source that generates fluorine radicals under fluorination treatment conditions. Examples of the above fluorine radical source include F$_2$ gas, CoF$_3$, AgF$_2$, UF$_6$, OF$_2$, N$_2$F$_2$, CF$_3$OF, and halogen fluorides (such as IF$_5$ and ClF$_3$).

The above fluorine radical source, such as F$_2$ gas, may have a concentration of 100%; however, from a viewpoint of safety, the fluorine radical source is preferably mixed with an inert gas and diluted to 5 to 50% by mass before use, and is more preferably diluted to 15 to 30% by mass before use. Examples of the above inert gas include nitrogen gas, helium gas, and argon gas; from a viewpoint of economy, nitrogen gas is preferred.

The conditions for the fluorination treatment described above are not limited, and the fluororesin in a molten state and the fluorine-containing compound may be contacted and this procedure can be performed usually at a temperature not higher than the melting point of the fluororesin, preferably at 20 to 220° C., more preferably at 100 to 200° C. The above fluorination treatment is typically performed for 1 to 30 hours, and preferably for 5 to 25 hours. The above fluorination treatment is preferably performed by contacting the fluororesin before the fluorination treatment with fluorine gas (F$_2$ gas).

The above fluororesin preferably has a melting point of 190 to 322° C. The above melting point is more preferably 200° C. or higher, still more preferably 220° C. or higher, and particularly preferably 280° C. or higher, and more preferably 315° C. or lower. The above melting point is the temperature that corresponds to the maximum value on a heat-of-fusion curve upon heating at a rate of 10° C./min using a differential scanning calorimeter [DSC].

The above fluororesin is not limited as long as it is a melt-fabricable fluororesin; however, because superior high-frequency electrical properties can be obtained, the fluororesin is more preferably at least one copolymer selected from the group consisting of a copolymer containing a tetrafluoroethylene unit (TFE unit) and a (per)fluoro(alkyl vinyl ether) unit (PAVE unit) (this copolymer is hereinafter referred to as the TFE/PAVE copolymer (or PFA)) and a copolymer containing the TFE unit and a hexafluoropropylene unit (HFP unit) (this copolymer is hereinafter referred to as the TFE/HFP copolymer (or FEP)), still more preferably at least one copolymer selected from the group consisting of the TFE/PAVE copolymer and a TFE/HFP/PAVE copolymer, and particularly preferably the TFE/PAVE copolymer. In particular, it is preferred that the above fluororesin be a copolymer containing the PAVE unit, because a fluororesin material having excellent high-frequency electrical properties and simultaneously, having a relatively high strength at break, is obtained.

The (per)fluoro(alkyl vinyl ether) (PAVE) may be either a fluoroalkyl vinyl ether or a perfluoro(alkyl vinyl ether). As used herein, "perfluoro(alkyl vinyl ether)" is an alkyl vinyl ether not containing a C—H bond.

The examples of the PAVE constituting the PAVE unit described above include at least one selected from the group consisting of a monomer represented by the general formula (1):

$$CF_2=CFO(CF_2CFY^1O)_p—(CF_2CF_2CF_2O)_q—R^f \qquad (1)$$

wherein Y$^1$ represents F or CF$_3$; R$^f$ represents a perfluoroalkyl group having 1 to 5 carbon atoms; p represents an integer from 0 to 5; and q represents an integer from 0 to 5; and a monomer represented by the general formula (2):

$$CFX=CXOCF_2OR^1 \qquad (2)$$

wherein each X is the same or different and represents H, F, or CF$_3$; and R$^1$ represents a linear or branched fluoroalkyl group having 1 to 6 carbon atoms that may contain one or two atoms of at least one selected from the group consisting of H, Cl, Br, and I, or a cyclic fluoroalkyl group having 5 or 6 carbon atoms that may contain one or two atoms of at least one selected from the group consisting of H, Cl, Br, and I.

Among these, the above PAVE is preferably a monomer represented by the general formula (1), more preferably at least one selected from the group consisting of perfluoro (methyl vinyl ether), perfluoro(ethyl vinyl ether), and perfluoro(propyl vinyl ether) (PPVE), and still more preferably PPVE.

The content of the PAVE unit in the TFE/PAVE copolymer described above, based on the total content of monomer units, is preferably 1.0 to 10% by mass, more preferably 2.0% by mass or more, still more preferably 3.5% by mass or more, particularly preferably 4.0% by mass or more, and most preferably 5.0% by mass or more, and more preferably 8.0% by mass or less, more preferably 7.0% by mass or less, particularly preferably 6.5% by mass or less, and most preferably 6.0% by mass or less. The content of the PAVE unit described above is measured by the $^{19}$F-NMR method.

The above TFE/PAVE copolymer may be a copolymer consisting only of the TFE unit and the PAVE unit.

The melting point of the above TFE/PAVE copolymer is preferably 280 to 322° C., and more preferably 290° C. or higher, and more preferably 315° C. or lower.

The glass transition temperature (Tg) of the above TFE/PAVE copolymer is preferably 70 to 110° C., and more preferably 80° C. or higher, and more preferably 100° C. or lower. The above glass transition temperature is the value measured by dynamic viscoelasticity measurement.

The above TFE/PAVE copolymer can be produced by a conventionally known method, for example, by appropriately mixing the monomers used as its constituent units and additives such as a polymerization initiator and subjecting the mixture to emulsion polymerization or suspension polymerization.

The above TFE/HFP copolymer contains the TFE unit and the HFP unit. The content of the TFE unit in the TFE/HFP copolymer described above, based on the total content of monomer units, is preferably 70% by mass or more, and more preferably 85% by mass or more, and preferably 99.8% by mass or less, more preferably 99% by mass or less, and still more preferably 98% by mass or less.

The above TFE/HFP copolymer preferably has a mass ratio of the TFE unit to the HFP unit (TFE/HFP) of 70 to 99/1 to 30 (% by mass). The mass ratio (TFE/HFP) described above is more preferably 85 to 95/5 to 15 (% by mass).

The above TFE/HFP copolymer may further contain a (per)fluoro(alkyl vinyl ether) (PAVE) unit. Examples of the PAVE unit contained in the TFE/HFP copolymer described above include the same ones as those mentioned for the PAVE unit above. The TFE/PAVE copolymer mentioned above differs from the TFE/HFP/PAVE copolymer in that it does not contain the HFP unit.

When the above TFE/HFP copolymer is a copolymer containing the TFE unit, the HFP unit, and the PAVE unit (hereinafter also referred to as "TFE/HFP/PAVE copolymer"), the mass ratio (TFE/HFP/PAVE) is preferably 70 to 99.8/0.1 to 25/0.1 to 25 (% by mass). The mass ratio (TFE/HFP/PAVE) described above is more preferably 75 to 98/1.0 to 15/1.0 to 10 (% by mass). In the above TFE/HFP/PAVE copolymer, the total content of the HFP unit and the PAVE unit is preferably 1% by mass or more.

In the above TFE/HFP/PAVE copolymer, the content of the HFP unit is preferably 25% by mass or less based on the total content of monomer units. The content of the HFP unit is more preferably 20% by mass or less, still more preferably 18% by mass or less, and particularly preferably 15% by mass or less. On the other hand, the content of the HFP unit is preferably 0.1% by mass or more, more preferably 1% by mass or more, and particularly preferably 2% by mass or more. The content of the HFP unit can be measured by the $^{19}$F-NMR method.

The content of the PAVE unit is more preferably 20% by mass or less, still more preferably 10% by mass or less, and particularly preferably 3% by mass or less. On the other hand, the content of the PAVE unit is preferably 0.1% by mass or more, and more preferably 1% by mass or more. The content of the PAVE unit can be measured by the $^{19}$F-NMR method.

The above TFE/HFP copolymer may further contain another ethylenic monomer ($\alpha$) unit. The other ethylenic monomer ($\alpha$) unit is not limited as long as it is a monomer unit copolymerizable with TFE, HFP, and PAVE; examples include fluorine-containing ethylenic monomers, such as vinyl fluoride (VF), vinylidene fluoride (VdF), chlorotrifluoroethylene [CTFE], and ethylene (ETFE), and non-fluorinated ethylenic monomers, such as ethylene, propylene, and alkyl vinyl ethers. The content of the other ethylenic monomer ($\alpha$) unit is preferably 0 to 25% by mass, and more preferably 0.1 to 25% by mass.

When the above copolymer is a copolymer of TFE/HFP/PAVE/other ethylenic monomer ($\alpha$), the mass ratio (TFE/HFP/PAVE/other ethylenic monomer ($\alpha$)) is preferably 70 to 98/0.1 to 25/0.1 to 25/0.1 to 25 (% by mass). In the above copolymer of TFE/HFP/PAVE/other ethylenic monomer ($\alpha$), the total content of the monomer units other than the TFE unit is preferably 1% by mass or more.

The melting point of the above TFE/HFP copolymer is preferably 200 to 322° C., more preferably above 200° C., and still more preferably 220° C. or higher, and more preferably 300° C. or lower, and still more preferably 280° C. or lower.

The glass transition temperature (Tg) of the above TFE/HFP copolymer is preferably 60 to 110° C., and more preferably 65° C. or higher, and more preferably 100° C. or lower. The glass transition temperature described above is the value measured by dynamic viscoelasticity measurement.

The above TFE/HFP copolymer can be produced by a conventionally known method, for example, by appropriately mixing the monomers used as constituent units and additives such as a polymerization initiator, and subjecting the mixture to emulsion polymerization, solution polymerization, or suspension polymerization.

The above fluororesin is also preferably the above TFE/PAVE copolymer and the above TFE/HFP copolymer. That is, the above TFE/PAVE copolymer and the above TFE/HFP copolymer can be used as a mixture. The mass ratio of the above TFE/PAVE copolymer to the above TFE/HFP copolymer ((A)/(B)) is preferably 1/9 to 7/3, and more preferably 5/5 to 2/8.

The above mixture may be prepared by a known method, for example, by melt-mixing (melt-kneading) a mixture of two or more of the above fluororesins, or by mixing the resin dispersions after emulsion polymerization, and coagulating the mixture with an acid such as nitric acid to collect the resins.

The melt flow rate (MFR) at 372° C. of the above fluororesin is preferably 0.1 to 100 g/10 min, and more preferably 0.5 g/10 min or more, and more preferably 80 g/10 min or less, and still more preferably 40 g/10 min or less. When the MFR falls in the above-described range, superior high-frequency electrical properties can be obtained and simultaneously, superior melt-fabricability can be obtained. The MFR is the value determined in accordance with ASTM D1238 as the mass (g/10 min) of the polymer that flows out of a nozzle with an inner diameter of 2 mm and a length of 8 mm at 372° C. under a load of 5 kg, per 10 minutes, using a melt indexer (Yasuda Seiki Company).

The strength at break of the fluororesin material of the present disclosure is preferably 13 MPa or more, and more preferably 15 MPa or more; while the upper limit is not limited, it may be 30 MPa or less, and 25 MPa or less. The fluororesin material of the present disclosure can be produced by melt-fabrication and simultaneously, can have such a high strength at break. When the strength at break of the fluororesin material of the present disclosure falls in the above-described range, the strength at break of the fluororesin material of the present disclosure can also be applied to uses that require high mechanical strength.

The fluororesin material of the present disclosure may optionally contain other components. Examples of the other components include additives such as a crosslinking agent, an antistatic agent, a heat-resistant stabilizer, a foaming agent, a foaming nucleating agent, an antioxidant, a surfactant, a photopolymerization initiator, an antiwear agent, and a surface modifier.

The fluororesin material of the present disclosure can be produced by, for example, a production method including irradiating the fluororesin that has not been irradiated with radiation with radiation at 20 to 100 kGy, at 80 to 240° C.

From the viewpoint of achieving both excellent high-frequency electrical properties and high strength at break, the irradiation temperature of radiation is 80 to 240° C., preferably 100° C. or higher, and more preferably 140° C. or higher, and preferably 220° C. or lower, more preferably 200° C. or lower, and still more preferably 180° C. or lower. Preferably, the above irradiation temperature falls in the above-described numerical range and is lower than the melting point of the fluororesin before irradiation.

The method of adjusting the above irradiation temperature is not limited and may be a known method. Specifically, examples of the method include a method in which the above fluororesin is held in a heated furnace kept at a predetermined temperature; and a method in which the fluororesin is placed on a hot plate, and then the hot plate is heated by applying electric current through a built-in heater of the hot plate or by means of an external heating means.

From the viewpoint of achieving both excellent high-frequency electrical properties and high strength at break, the radiation dose is 20 to 100 kGy, preferably 95 kGy or less, and more preferably 80 kGy or less, and preferably 30 kGy or more, and more preferably 40 kGy or more.

Examples of the radiation include an electron beam, ultraviolet ray, gamma-ray, X-ray, a neutron beam, and a high energy ion. Among these, an electron beam is preferred because of its excellent penetrability, a high dose rate, and suitability for industrial production.

Examples of the irradiation method include, but are not limited to, a method using a conventionally known irradiation device.

While the irradiation environment is not limited, the irradiation is preferably performed at an oxygen concentration of 1000 ppm or less, more preferably in the absence of oxygen, and still more preferably in a vacuum or in an inert gas atmosphere, such as nitrogen, helium, or argon.

The method for producing the above fluororesin material preferably further includes molding the fluororesin that has not been irradiated with radiation or molding the fluororesin after irradiation. For ease of molding, the fluororesin is preferably molded before being irradiated with radiation. That is, the method for producing the above fluororesin material more preferably further includes molding the fluororesin that has not been irradiated with radiation. By including these steps in the method for producing the above fluororesin material, the fluororesin material having a desired shape can be produced.

The method of molding the above fluororesin may be a method in which the above fluororesin is melted by heating to a temperature not lower than the melting point and then molded. Examples of the above-described method of molding the fluororesin include, but are not limited to, known methods, such as extrusion molding, injection molding, transfer molding, inflation molding, and compression molding. Any of these molding methods may be selected appropriately according to the shape of the fluororesin material to be obtained.

Examples of the shape of the fluororesin material of the present disclosure include, but are not limited to, a pellet, a film, a sheet, a plate, a rod, a block, a cylinder, a container, an electric wire, and a tube. The shape of the fluororesin material of the present disclosure may also be a fluororesin coating film that forms a coating layer for cookware, such as an inner pot of a rice cooker, a hot plate, or a frying pan, or a topcoat layer for a fixing roller of an image-forming apparatus, such as an electrophotography-type or electrostatic recording-type copying machine or a laser printer. The fluororesin coating film can be formed by applying the fluororesin coating material to a base material.

The fluororesin material of the present disclosure, which has a low dielectric constant and a low dielectric loss tangent, can be particularly suitably used as a fluororesin material for high-frequency transmission.

The dielectric loss α of a high-frequency signal can be calculated in accordance with the following equation:

$$\alpha = k\sqrt{\varepsilon_r} \cdot \tan \delta \cdot f$$

$$(A = \sqrt{\varepsilon_r} \cdot \tan \delta) \qquad \text{[Expression 1]}$$

In the equation shown above, k is the constant, $\varepsilon_r$ is the dielectric constant, tan δ is the dielectric loss tangent, f is the signal frequency, and A is the dielectric loss contribution. The use of the fluororesin material of the present disclosure can reduce the dielectric loss contribution A of the dielectric loss α of a high-frequency signal, and thus, can be expected to realize a product for high-frequency transmission having a minimized transmission loss at high frequencies.

The product for high-frequency-signal transmission described above is not limited as long as it is a product used for transmitting a high-frequency signal, for example: (1) a molded plate, such as an insulating plate for a high-frequency circuit, an insulator for a connection member, and a printed wiring board; (2) a molded article, such as a base for a high-frequency vacuum tube and an antenna cover; and (3) a coated electric wire, such as a coaxial cable or a LAN cable.

In the product for high-frequency-signal transmission described above, the fluororesin material of the present disclosure can be suitably used as an insulator, because of the low dielectric constant and the low dielectric loss tangent.

The molded plate (1) described above is preferably a printed wiring board because good electrical properties can be obtained. Examples of the above printed wiring board include, but are not limited to, printed wiring boards for electronic circuits of cellular phones, various computers, communication devices, and the like. The molded article (2) described above is preferably an antenna cover because the dielectric loss is low.

Examples of the method for producing the molded plate (1) and the molded article (2) described above include, but are not limited to, a production method including molding the fluororesin that has not been irradiated with radiation; and irradiating the molded fluororesin with radiation under the above-described irradiation conditions. In this case, examples of the molding method include compression molding, and extrusion and rolling molding.

The coated electric wire (3) described above is preferably a coated electric wire for high-frequency transmission that includes the fluororesin material of the present disclosure as an insulating coating layer, because good electrical properties can be obtained. When a coated electric wire for high-frequency transmission includes an insulating coating layer formed of the above fluororesin material, an extremely low high-frequency transmission loss can be obtained. The above coated electric wire for high-frequency transmission may be a high-frequency transmission cable, and the above high-frequency transmission cable is preferably a coaxial cable. The above coaxial cable typically has a structure in which an inner conductor, an insulating coating layer, an outer conductor layer, and a protective coating layer are stacked in this order from the core to the outer periphery. While the thickness of each of the layers in the above structure is not limited, usually, the inner conductor is about 0.1 to 3 mm in diameter, the insulating coating layer is about 0.3 to 3 mm in thickness, the outer conductor layer is about 0.5 to 10 mm in thickness, and the protective coating layer is about 0.5 to 2 mm in thickness.

The above insulating coating layer may be a foamed insulating coating layer. However, because the fluororesin material of the present disclosure has a low dielectric constant and a low dielectric loss tangent, and a coated electric wire having a low transmission loss can be obtained even if the fluororesin material is not foamed, in above the coated electric wire for high-frequency transmission, the insulating coating layer formed of the above fluororesin material may be a solid insulating coating layer. When the above coated electric wire for high-frequency transmission includes a solid insulating coating layer that is formed of the above fluororesin material, and is free of a gap, the above coated electric wire for high-frequency transmission has an excellent mechanical strength and is unlikely to lose the stability of the dielectric constant even upon bending. As used herein, solid means that the inside is filled with the fluororesin material and contains substantially no gap. It is noted, however, that a gap unintentionally formed due to a molding defect or the like may be contained. In contrast, the foamed insulating coating layer contains many gaps. For the foregoing reasons, the fluororesin material of the present disclosure may be a solid fluororesin material.

The coated electric wire (3) described above can be produced by, for example, a production method including coating an inner conductor with the fluororesin that has not irradiated with radiation by extrusion molding to form a coating layer on the inner conductor; and irradiating the above coating layer with radiation under the above-described irradiation conditions to form the above fluororesin material, thereby obtaining a coated electric wire including the above fluororesin material as an insulating coating layer.

The product for high-frequency-signal transmission described above can be suitably used for devices that utilize microwaves, particularly 3 to 30 GHz microwaves, such as satellite communication devices and cellular phone base stations.

While the embodiments have been described above, it will be understood that various changes can be made to the modes or details, without departing from the spirit and scope of the claims.

EXAMPLES

The embodiments of the present disclosure will be described next with reference to Examples, and the present disclosure is not limited solely to the Examples.

Each of numerical values recited in Examples was measured by the following methods.

(Content of Monomer Unit)

The content of each monomer unit was measured by the $^{19}$F-NMR method.

(MFR)

The MFR was determined in accordance with ASTM D1238 as the mass (g/10 min) of the polymer that flows out of a nozzle with an inner diameter of 2 mm and a length of 8 mm at 372° C. under a load of 5 kg, per 10 minutes, using a melt indexer (Yasuda Seiki Company).

(Melting Point)

The melting point was determined as the temperature that corresponds to the maximum value on a heat-of-fusion curve upon heating at a rate of 10° C./min using a differential scanning calorimeter [DSC].

(Number of Functional Groups)

A sample was melted at 330 to 340° C. for 30 minutes and then compression-molded to prepare a film having a thickness of 0.25 to 0.3 mm. This film was analyzed by performing 40 scans using a Fourier transform infrared spectrometer ([FT-IR (trade name: model 1760X manufactured by PerkinElmer Co., Ltd.) to obtain an infrared absorption spectrum, and then a difference spectrum was obtained between the infrared absorption spectrum and a base spectrum of a completely fluorinated resin containing no functional group. Based on the absorption peak of a specific functional group appearing in this difference spectrum, the number N of the functional groups per $1 \times 10^6$ carbon atoms in the sample was calculated in accordance with the following equation (A):

$$N = I \times K / t \quad (A), \text{ wherein}$$

I: absorbance;
K: correction factor; and
t: thickness (mm) of the film.

For reference, Table 2 shows the absorption frequencies, molar extinction coefficients, and correction factors for functional groups in the present disclosure. The molar extinction coefficients are those determined based on the FT-IR measurement data of low-molecular-weight model compounds.

TABLE 2

| Functional Group | Absorption Frequency (cm$^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH$_2$, —OH | 3648 | 104 | 2236 | $C_7H_{15}CH_2OH$ |
| —CF$_2$H | 3020 | 8.8 | 26485 | $H(CF_2CF_2)_3CH_2OH$ |
| —CF=CF$_2$ | 1795 | 635 | 366 | $CF_2$=$CF_2$ |

(Strength at Break and Strength Retention Ratio)

A dumbbell specimen was cut out from a specimen (compression-molded) obtained in each of the examples or the comparative examples, using an ASTM V-type dumbbell, and the strength at break at 25° C. of the obtained dumbbell specimen was measured at 50 mm/min in accordance with ASTM D638, using an autograph (AGS-J 5 kN manufactured by Shimadzu Corporation).

The strength retention ratio was determined in accordance with the following equation:

Strength retention ratio (%)=(strength at break after electron beam irradiation/reference strength at break)×100

The reference strength at break is the strength at break after the fluorination treatment and before electron beam irradiation. For Examples 1 to 5, the strength at break of Comparative Example 2 was used as the reference strength at break. For Examples 6 and 7, the strength at break of Comparative Example 4 was used as the reference strength at break. For Example 8, the strength at break of Comparative Example 6 was used as the reference strength at break.

(Dielectric Loss Tangent, Dielectric Constant, and Dielectric Loss Contribution)

The dielectric loss tangent and the dielectric constant of a specimen (extrusion-molded) obtained in each of the Examples or Comparative Examples were measured using a cavity resonator method. The dielectric loss tangent (tan δ) and the dielectric constant ($\varepsilon_r$) at 12 GHz were measured by measuring changes in resonant frequency and Q-factor (electric field intensity) at a temperature of 20 to 25° C., using a network analyzer (HP8510C manufactured by Hewlett-Packard Company). Based on the dielectric loss tangent and the dielectric constant, the dielectric loss contribution A was determined in accordance with the following equation:

$$A=\sqrt{\varepsilon_r}\times\tan\delta \quad \text{[Expression 2]}$$

Comparative Example 1

A pellet of a TFE/PPVE copolymer was used.
Composition: TFE/PPVE=94.5/5.5 (% by mass)
MFR: 26.0 (g/10 min)
Melting point: 303° C.
Number of functional groups: 321 (OH/COF/COOH=150/17/154 (groups))

(Preparation of Specimen (Extrusion-Molded))

The above pellet was extrusion-molded using an extrusion molding machine. Six grams of the above pellet was introduced into a cylinder with a diameter of 10 mm and melted by heating at 372° C. for 5 minutes, and then extruded through a die having a diameter of 2 mm and a length of 8 mm at a load of 5 kg to be molded into a bar shape having a length of 100 mm for use as a specimen (extrusion-molded). The dielectric loss tangent, dielectric constant, and dielectric loss contribution of the obtained specimen (extrusion-molded) were measured by the above-described methods. The results are shown in Table 3.

(Preparation of Specimen (Compression-Molded))

The above pellet was molded into a disc shape having a diameter of 120 mm and a thickness of 1.5 mm for use as a specimen (compression-molded), using a heat press molding machine. The strength at break and strength retention ratio of the obtained specimen (compression-molded) were measured by the above-described methods. The results are shown in Table 3.

Comparative Example 2

The pellet used in Comparative Example 1 was placed in a container and then subjected to a fluorine-gas treatment by passing fluorine gas diluted to 20% by mass with nitrogen gas under atmospheric pressure at 200° C. for 10 hours. The number of functional groups was measured for the pellet obtained after the fluorine-gas treatment; as a result, no functional group was detected. Additionally, a specimen (extrusion-molded) and a specimen (compression-molded) were obtained as in Comparative Example 1, except that the pellet obtained after the fluorine-gas treatment was used, and the specimens were evaluated as in Comparative Example 1. The results are shown in Table 3.

Example 1

The specimen (extrusion-molded) and the specimen (compression-molded) obtained in Comparative Example 2 were contained in the electron beam irradiation container of an electron beam irradiation device (manufactured by NHV Corporation), and then nitrogen gas was added to replace the atmosphere in the container with a nitrogen atmosphere. After the stabilization of the temperature in the container at the irradiation temperature shown in Table 3 was confirmed, each of the specimens was irradiated with an electron beam at the radiation dose shown in Table 3, at an electron beam acceleration voltage of 3000 kV and a radiation dose intensity of 20 kGy/5 min. The specimens were evaluated as in Comparative Example 1, except that the electron beam-irradiated specimens were used. The results are shown in Table 3.

Examples 2 to 5

Specimens were obtained as in Example 1, except that they were each irradiated with an electron beam under the conditions shown in Table 3. The obtained specimens were evaluated as in Comparative Example 1. The results are shown in Table 3.

Comparative Example 3

Specimens were obtained as in Comparative Example 1, except that a pellet of a TFE/PPVE/HFP copolymer was used. The obtained specimens were evaluated as in Comparative Example 1. The results are shown in Table 3.
Composition: TFE/PPVE/HFP=87.9/1.0/11.1 (% by mass)
MFR: 24.0 (g/10 min)
Melting point: 257° C.
Number of functional groups: 517 (COF/COOH/CF$_2$H=22/12/483 (groups))

Comparative Example 4

The fluorine-gas treatment was performed as in Comparative Example 2, except that the pellet used in Comparative Example 3 was used. The number of functional groups was measured for the pellet obtained after the fluorine-gas treatment; as a result, no functional group was detected. Additionally, a specimen (extrusion-molded) and a specimen (compression-molded) were obtained as in Comparative Example 1, except that the pellet obtained after the fluorine-gas treatment was used, and the specimens were evaluated as in Comparative Example 1. The results are shown in Table 3.

Examples 6 and 7

Specimens were obtained as in Example 1, except that the pellet obtained in Comparative Example 4 was used, and the pellet was irradiated with an electron beam under the conditions shown in Table 3. The obtained specimens were evaluated as in Comparative Example 1. The results are shown in Table 3.

Comparative Example 5

Specimens were obtained as in Comparative Example 1, except that a pellet of a TFE/HFP copolymer was used. The obtained specimens were evaluated as in Comparative Example 1. The results are shown in Table 3.

Composition: TFE/HFP=88.9/11.1 (% by mass)
MFR: 27.0 (g/10 min)
Melting point: 266° C.
Number of functional groups: 404 (COF/COOH/$CF_2H$=2/28/374 (groups))

Comparative Example 6

The fluorine-gas treatment was performed as in Comparative Example 2, except that the pellet used in Comparative Example 5 was used. The number of functional groups was measured for the pellet obtained after the fluorine-gas treatment; as a result, no functional group was detected. Additionally, a specimen (extrusion-molded) and a specimen (compression-molded) were obtained as in Comparative Example 1, except that the pellet obtained after the fluorine-gas treatment was used, and the specimens were evaluated as in Comparative Example 1. The results are shown in Table 3.

Example 8

Specimens were obtained as in Example 1, except that the pellet obtained in Comparative Example 6 was used, and the pellet was irradiated with an electron beam under the conditions shown in Table 3. The obtained specimens were evaluated as in Comparative Example 1. The results are shown in Table 3.

TABLE 3

|  | Number of Functional Groups (groups/$10^6$ atoms) | Irradiation-Treated or Not | Irradiation Temperature (° C.) | Radiation Dose (kGy) | Strength at Break (MPa) | Strength Retention Ratio (%) | Dielectric Loss Tangent (tanδ) | Dielectric Constant (∈r) | Dielectric Loss Contribution A |
|---|---|---|---|---|---|---|---|---|---|
| Comparative Example 1 | 321 | No | — | — | 32 | 107 | 0.00068 | 2.05 | 0.00097 |
| Comparative Example 2 | 0 | No | — | — | 30 | 100 | 0.00032 | 2.05 | 0.00046 |
| Example 1 | 4 | Yes | 80 | 60 | 22 | 73 | 0.00018 | 2.07 | 0.00026 |
| Example 2 | 6 | Yes | 180 | 80 | 18 | 60 | 0.00013 | 2.09 | 0.00019 |
| Example 3 | 2 | Yes | 200 | 20 | 19 | 64 | 0.00019 | 2.07 | 0.00027 |
| Example 4 | 4 | Yes | 200 | 60 | 18 | 60 | 0.00015 | 2.08 | 0.00021 |
| Example 5 | 6 | Yes | 200 | 100 | 15 | 50 | 0.00013 | 2.09 | 0.00019 |
| Comparative Example 3 | 517 | No | — | — | 30 | 103 | 0.00078 | 2.05 | 0.00112 |
| Comparative Example 4 | 0 | No | — | — | 29 | 100 | 0.00053 | 2.05 | 0.00076 |
| Example 6 | 4 | Yes | 80 | 40 | 23 | 75 | 0.00023 | 2.06 | 0.00033 |
| Example 7 | 4 | Yes | 180 | 40 | 20 | 65 | 0.00016 | 2.08 | 0.00023 |
| Comparative Example 5 | 404 | No | — | — | 32 | 100 | 0.00062 | 2.06 | 0.00089 |
| Comparative Example 6 | 0 | No | — | — | 32 | 100 | 0.00042 | 2.06 | 0.00060 |
| Example 8 | 0 | Yes | 180 | 40 | 21 | 65 | 0.00017 | 2.07 | 0.00024 |

The invention claimed is:

1. A fluororesin material comprising a melt-fabricable fluororesin and having a dielectric constant of 2.1 or less and a dielectric loss tangent of 0.00020 or less at 12 GHz,
    wherein the total number of functional groups consisting of —CF=CF$_2$, —CF$_2$H, —COF, —COOH, —COOCH$_3$, —CONH$_2$, and CH$_2$OH per $10^6$ main-chain carbon atoms of the fluororesin is 6 or less, and
    wherein the fluororesin is at least one copolymer selected from the group consisting of a tetrafluoroethylene/(per)fluoro(alkyl vinyl ether) copolymer and a tetrafluoroethylene/hexafluoropropylene copolymer.

2. A fluororesin material for high-frequency transmission comprising the fluororesin material according to claim 1.

3. A coated electric wire for high-frequency transmission comprising the fluororesin material according to claim 1 as an insulating coating layer, wherein the insulating coating layer is a solid insulating coating layer.

* * * * *